United States Patent [19]

Mochizuki et al.

[11] 4,351,008
[45] Sep. 21, 1982

[54] MODULATOR FOR USE IN AN INTERFACE BETWEEN A DIGITAL SIGNAL PROCESSING APPARATUS AND AN AUDIO TAPE DECK

[75] Inventors: Daisuke Mochizuki; Shigeru Kitano, both of Nara, Japan

[73] Assignee: Sharp Kabushiki Kaisha, Osaka, Japan

[21] Appl. No.: 114,745

[22] Filed: Jan. 24, 1980

[30] Foreign Application Priority Data

Jan. 25, 1979 [JP] Japan ................................. 54-7836

[51] Int. Cl.$^3$ ............................................. G11B 5/09
[52] U.S. Cl. ........................................ 360/40; 375/24
[58] Field of Search ................ 360/30, 43, 40; 375/24

[56] References Cited

U.S. PATENT DOCUMENTS

| | | | |
|---|---|---|---|
| 3,303,486 | 2/1967 | Young | 360/40 |
| 3,417,388 | 12/1968 | Timm | 360/40 |
| 3,459,892 | 8/1969 | Shagena et al. | 375/43 |
| 3,732,364 | 5/1973 | Terada | 360/40 |
| 3,904,965 | 9/1975 | Leuthold | 375/41 |
| 3,919,641 | 11/1975 | Kurokawa et al. | 375/41 |

Primary Examiner—Vincent P. Canney
Attorney, Agent, or Firm—Birch, Stewart, Kolasch & Birch

[57] ABSTRACT

An improved modulator is capable of facilitating recording and reproducing on and from an audio cassette tape digital signals such as programs and numerical data coming from digital signal processing apparatus including an electronic cash register as well as providing safety for the audio cassette tape when in operation. The modulator includes a control circuit for detecting and counting carrier signals and outputting desired information in response to a data transfer instruction and a state detector governed by the control circuit wherein the carrier signals are sent out via data transfer lines when the detector is in a specific state. The control circuit may be implemented with a microprocessor.

4 Claims, 14 Drawing Figures

FIG. 1
FIG. 1 (A)
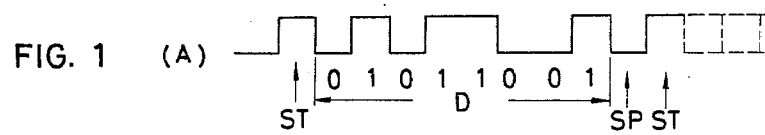
FIG. 1 (B)
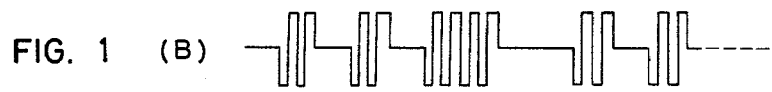
FIG. 2
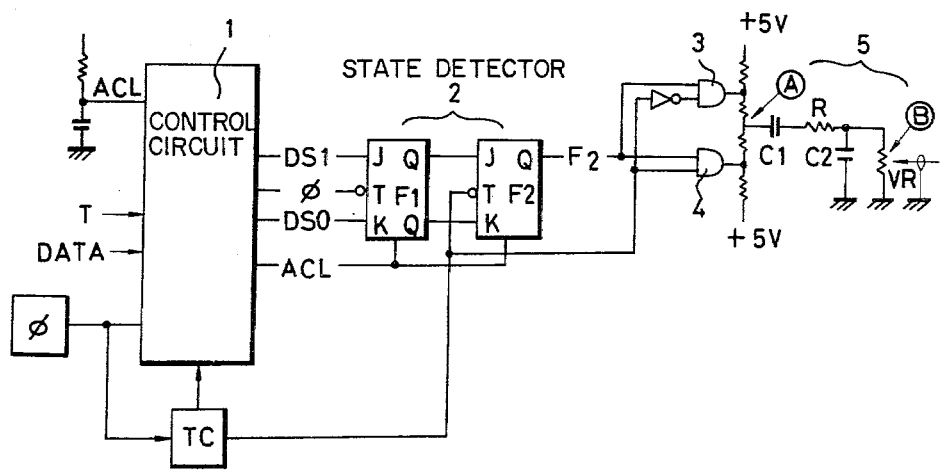

FIG. 6
FIG. 6 (a)
FIG. 6 (b)
FIG. 6 (c)
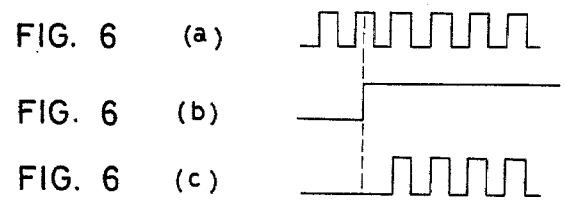
FIG. 7
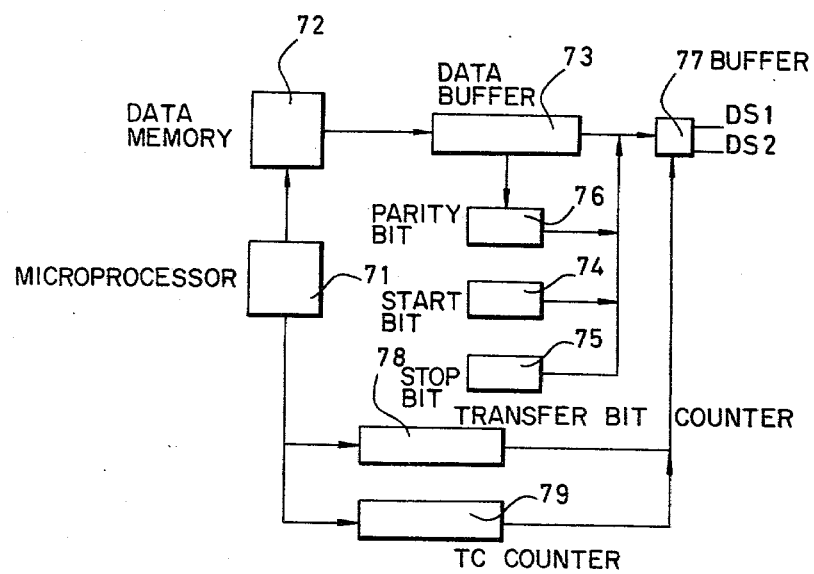

4,351,008

MODULATOR FOR USE IN AN INTERFACE BETWEEN A DIGITAL SIGNAL PROCESSING APPARATUS AND AN AUDIO TAPE DECK

BACKGROUND OF THE INVENTION

This invention relates to an interface between a digital signal processing apparatus such as an electronic cash register and an audio tape deck for recording and reproducing digital signals including programs and data on and from a commercial available audio cassette tape, and more particularly to a modulator for use in such an interface.

OBJECTS AND SUMMARY OF THE INVENTION

It is an object of the present invention to provide an improved modulator capable of facilitating modulation in recording and reproducing on and from an audio cassette tape digital signals such as programs and numerical data coming from digital signal processing apparatus including an electronic cash register as well as providing safety for the audio cassette tape when in operation. The present invention also makes it possible to use a microprocessor which saves space and reduces cost of manufacture.

BRIEF DESCRIPTION OF THE DRAWINGS

For a more complete understanding of the present invention and for further objects and advantages thereof, reference is now made to the following description taken in conjunction with the accompanying drawings, in which:

FIG. 1, including A & B, is a waveform diagram showing digital signals and its modulated waveforms according to the present invention;

FIG. 2 is a schematic diagram of a modulator according to one preferred embodiment of the present invention;

FIG. 6 is a time chart showing some signals developing in connection with the gates 6 and 8 in FIG. 3; and FIG. 7 is a schematic diagram of another preferred embodiment of the present invention.

DETAILED DESCRIPTION OF THE PREFERRED EMBODIMENTS

Referrng now to FIG. 1, there is illustrated the waveform of digital signals modulated by virtue of a modulator embodying the present invention, wherein the basic format of one character of data to be transferred consists of 1 start bit (ST), 8 data bits (D) and 1 stop bit (SP), and thus a total of 10 bits, for example, as depicted in FIG. 1(A). The start bit provides synchroneous signals between two adjacent characters and takes a logic level "H" whereas the stop bit is a signal indicative of the end of each character and takes a logic level "L".

Figure 3:
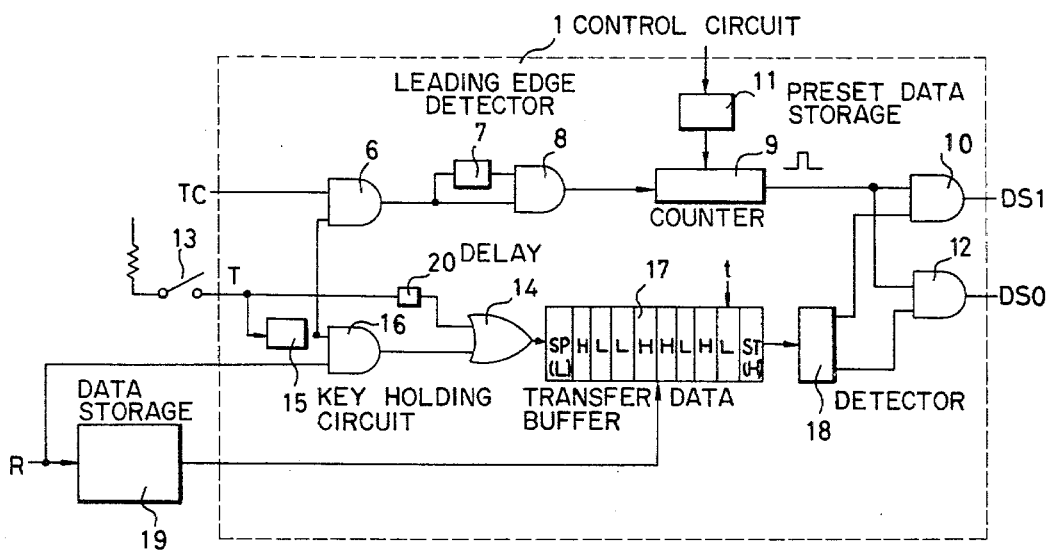
FIG. 3 is a circuit diagram illustrating details of a control circuit in the modulator of FIG. 2.

Data is introduced into a record terminal of a cassette tape deck (not shown) through the modulator of FIGS. 2 and 3 in such a manner that logic "1" signals are modulated into the signals as depicted in FIG. 1(B).

FIG. 2 is a schematic diagram of the modulator according to one preferred embodiment of the present invention. A control circuit 1 is adapted to generate control signals in response to the transfer speed of the data, the count of time per data bit and "H" signals of the data being transferred in order to send carrier signals to transmission lines. The control circuit 1 is connected to a state detector 2 which is set or reset in response to the "H" or "L" level of the data being transferred and in turn connected to logic gates 3 and 4 and a converter 5. The former are responsive to the "H" level signals to send the carrier signals to the transmission lines and the latter converts the outputs of the logic gates 3 and 4 into analog signals.

The control circuit 1 is also coupled with a data transmission instruction T, a system synchroneous signal $\phi$, an auto-clear signal ACL for the entire system and the modulating carrier signal $T_C$ which is originated from the synchroneous signal $\phi$ and of a sufficiently high frequency as compared with the data transmission frequency.

When the data being transmitted are "H", the output signal $DS_1$ of the control circuit 1 sets a latch $F_1$ contained in the state detector 2. Contrarily, another output signal $DS_O$ of the control circuit 1 is a control signal which may reset the same latch $F_1$ in the state detector 2 when the data are "L".

The converter 5 includes a coupling capacitor $C_1$ for connection to the audio cassette deck and attenuators R and VR for setting up an optimum recording level. Components R and $C_2$ establish a low-pass filter.

FIG. 3 shows the details of the control circuit 1 shown in FIG. 2, wherein the carrier signal $T_C$ is coupled with one input terminal of logic AND gate 6 whose output terminal is connected to one input terminal of a logic AND gate 8 via a detector 7 for sensing the leading edge of the carrier signal and the other input terminal thereof directly. The output terminal of the logic AND gate 8 is connected to a counter 9 which counts the carrier signals per unit bit in conjunction with the data being transferred, the counter 9 being connected to a set terminal $DS_1$ of the latch $F_1$ in the state detector 2 through a logic AND gate 10 and to a reset terminal of the same latch $F_1$ in the state detector 2 through a logic AND gate 12. The counter 9 is further connected to a preset data storage 11 for storing settings of the count of the counter 9.

A key input switch 13 which enables the data to move from the digital signal processing apparatus to the audio tape deck, is connected to an input terminal of a logic OR gate 14 and to a key holding circuit 15 which holds an input introduced via the key input switch 13. The output terminal of the key holding circuit 15 is connected to respective input terminals of the logic AND gate 6 and a different logic AND gate 16 whose output terminal is connected to another input terminal of the logic OR gate 14 having its output terminal connected to an output control terminal of a transfer data buffer 17.

The transfer data buffer 17 is connected to a detector 18 which decides if the respective bits of the data being transferred are "H" or "L", respective output terminals of the detector 18 being connected to the remaining input terminals of the logic AND gates 10 and 12.

The above mentioned start signal ST and stop signal SP in conjunction with each transfer character are both previously loaded into the transfer data buffer 17. A transfer data read instruction is also supplied to the transfer data buffer 17 so that the transfer data are unloaded from a data storage 19 to the buffer 17.

Having disclosed and illustrated the configuration of the modulator for the purpose of transferring data from the digital signal processing apparatus to the audio cassette deck, the operation of the modulator device will now be described in greater detail with reference to a flow chart of FIG. 4 and a time chart of FIG. 5.

When it is desired to transfer data from the digital signal processing apparatus into the audio cassette deck, the operator depresses the input key 13 to initiate the transferring of the data. Upon depressing the input key 13 the data read instruction R is supplied to the data storage 19, thus unloading the data from the data storage 19 into the data transfer buffer 17 and rendering the logic OR gate 14 operative via a delay circuit 20. The first bit (the start bit) of the data now contained in the buffer 17 is thus fed to the next stage decision circuit 18 to decide whether the first bit is "H" or "L". Since the first bit always bears a "H" level, the decision circuit 18 delivers a high level signal "H" via its first output terminal to the one input terminal of the logic AND gate 10, thus rending the logic AND gate 10 operative (the steps $N_1$-$N_2$ of FIG. 4).

The key signal holding circuit 15, on the other hand, becomes operative to hold the key signal introduced via the input switch 13 and enable the logic AND gates 16 and 6 upon the depression of the input switch 13. The logic AND gate 6 when enabled allows the carrier signals $T_C$ to enter the leading edge detector 7 and the complete signal $T_C$ as shown in FIG. 6 is supplied to the counter 9 via the logic AND gate 8.

Figure 4:
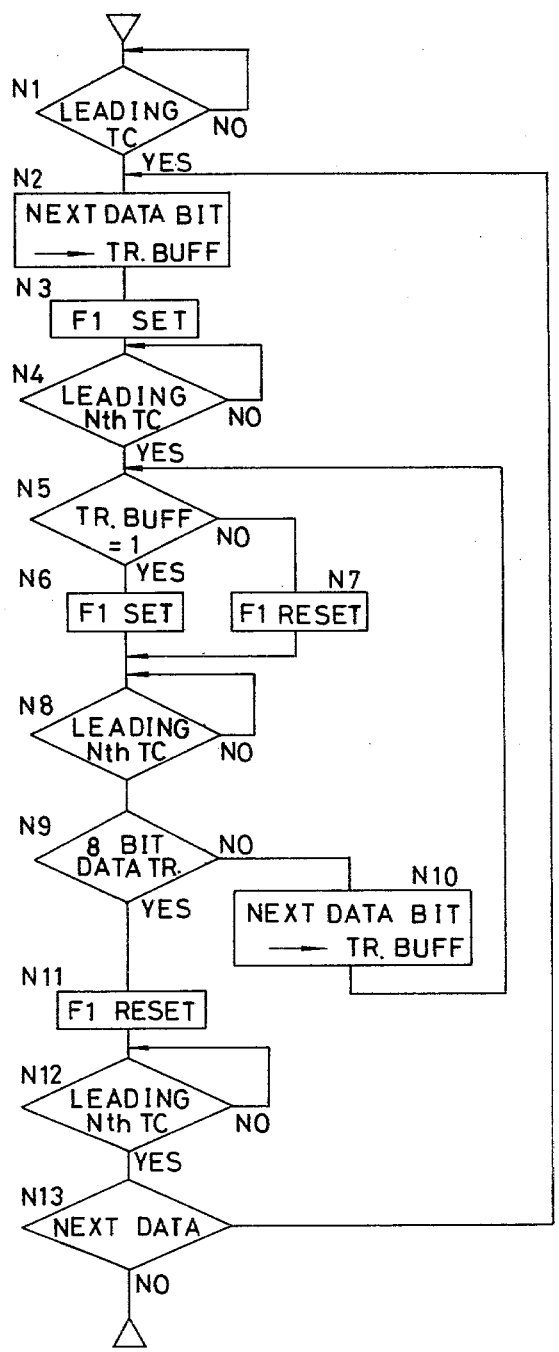
FIG. 4 is a flow chart for explanation of operation of the modulator shown in FIG. 2.

In this way, the counter 9 counts the number of the carrier signals ("2" in the given example) contained per bit in conjunction with the data in the storage 11 and delivers a pulse signal from its output terminal upon the completion of the counting performance, thus setting the latch $F_1$ in the state detector 2 via the logic AND gate 10 (the step $N_3$ of FIG. 4). It will be noted that the counter 9 delivers one pulse signal whenever it counts the number of the carrier signals contained per bit in conjunction with the data being transferred and always continues this operation during transmission of data.

Being set in this manner, the latch $F_1$ provides a right shift signal t for the data contained within the transfer data buffer 17. After the data have been shifted to the right, the second bit thereof is fed to the decision circuit 18. Since the second bit is "L", the high level signal "H" is delivered from the second output terminal of the decision circuit 18, thus rending the logic AND gate 12 operative and allowing the counter 9 to provide its output signal for the terminal $DS_O$ of the state detector 2 via the logic AND gate 12 and reset the latch $F_1$ (a series of the steps $N_4$, $N_5$ and $N_7$ of FIG. 4).

Likewise, the data is sequentially shifted right to the data buffer 17 and the decision circuit 18 decides whether the data are "H" or "L". As a consequence of this, the latch $F_1$ in the state detector 2 is either set or reset through the logic AND gates 10 and 12 and the signal waveform denoted as $F_2$ in FIG. 5 is developed at the output terminal of the latch $F_2$ in the detector 2 so that the signal as depicted in FIG. 5(B) is supplied from the output terminal of the electronic apparatus such as an electronic cash register to the audio cassette deck to complete the writing of 1-character data on the audio tape therein (the steps $N_5$-$N_{10}$ in FIG. 4).

Upon the completion of transmission of the 1-character data the data read instruction R is developed to unload the data in the data storage 19 into the buffer 17 which in turn transfers that data into the audio deck. The key signal holding circuit 15 is thereafter reset to clear the data transfer mode (the steps $N_9$ to $N_{11}$ in FIG. 4).

Figure 5:
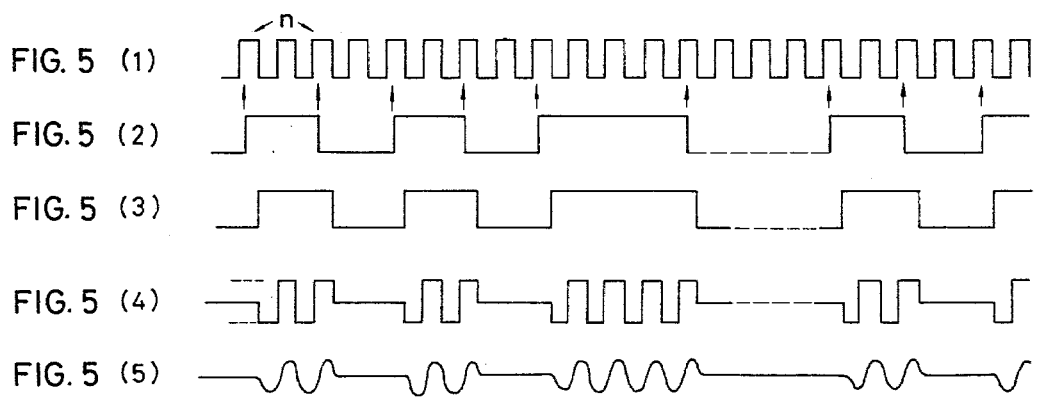
FIG. 5 is a time chart showing various signals developing within the modulator.

FIG. 5 indicates the TC signal (1), the output signal of the latch $F_1$ in the state detector 2(2), the output signal of the latch $F_2$ in the state detector 2(3), the signal at the node Ⓐ in FIG. 2(4), and the signal at the node Ⓑ in FIG. 2(5). The control circuit 1 may be implemented with one or more common microprocessors. As depicted in FIG. 7, a controller 71 (microprocessor) storing a flow chart of FIG. 4 in the form of stored programs given data stored in a data buffer 73 a start bit 74, a stop bit 75 and a parity bit 76 while monitoring the carrier signal TC. The data are then sent to a 1 bit buffer 77 and transfer bits are counted and transferred while the latch $F_1$ in the state detector 2 of FIG. 2. The use of the microprocessor makes the number of the carrier signals per bit in conjunction with the transfer data presettable in the same manner as with information from and to the electronic apparatus and thus makes the transfer rate freely adjustable. In FIG. 7, 72 denotes a data memory, 78 denotes a transfer bit counter and 79 denotes a TC counter.

Whereas the present invention has been described with respect to specific embodiments thereof, it will be understood that various changes and modifications will be suggested to one skilled in the art, and it is intended to encompass such changes and modifications as fall within the scope of the appended claims:

We claim:

1. A modulator comprising:
   control means for reading data words and for producing a digital output signal synchronized to a carrier signal in response to a data transmission instruction, said control means adding a start bit and a stop bit to each of said data words when producing said digital output signal;
   an output line; and
   state detector means for receiving said digital output signal from said control means and for passing said carrier signal to said output line when said digital output signal is in a first state and inhibiting the passage of said carrier signal to said output line when said digital output signal is in a second state.

2. The modulator of claim 1 wherein said control means includes:
   a buffer for temporarily storing each multiple bit data word, said buffer having start and stop bits permanently stored therein;
   a counter for counting carrier signals and producing a timing output; and
   means for transferring each bit of each data word including said start and stop bits to said state detector means as said digital output in synchronism with the timing output of said counter.

3. The modulator of claim 2 wherein said carrier signal includes a predetermined number of cycles per information bit.

4. The modulator of claim 3 wherein said data words are received from a digital signal processing apparatus; and
   wherein said output line is connected to an audio cassette tape deck.

* * * * *